United States Patent
Chou et al.

(10) Patent No.: US 7,534,022 B2
(45) Date of Patent: May 19, 2009

(54) BACKLIGHT MODULE

(75) Inventors: Wei-Jen Chou, Chu Nan (TW);
Po-Chuan Kang, Chu Nan (TW)

(73) Assignee: Young Lighting Technology Corporation (TW)

( * ) Notice: Subject to any disclaimer, the term of this patent is extended or adjusted under 35 U.S.C. 154(b) by 0 days.

(21) Appl. No.: 11/407,478

(22) Filed: Apr. 20, 2006

(65) Prior Publication Data
US 2006/0245203 A1 Nov. 2, 2006

(30) Foreign Application Priority Data
Apr. 29, 2005 (TW) .............................. 94113866 A

(51) Int. Cl.
*F21V 7/04* (2006.01)
(52) U.S. Cl. .................. 362/555; 362/551; 362/26; 362/27; 362/600; 362/608
(58) Field of Classification Search .................. 362/555, 362/551, 558, 559, 561, 26, 27, 600, 608, 362/610, 612, 613, 628
See application file for complete search history.

(56) References Cited
U.S. PATENT DOCUMENTS
5,363,294 A * 11/1994 Yamamoto et al. .......... 362/330
6,172,809 B1 * 1/2001 Koike et al. .................. 359/487
6,814,456 B1 * 11/2004 Huang et al. ................... 362/30
7,220,035 B2 * 5/2007 Buelow et al. ............... 362/560

FOREIGN PATENT DOCUMENTS
TW 255413 Y 1/2005

* cited by examiner

*Primary Examiner*—Sandra L O'Shea
*Assistant Examiner*—Mark Tsidulko
(74) *Attorney, Agent, or Firm*—Ohlandt, Greeley, Ruggiero & Perle, L.L.P.

(57) ABSTRACT

A backlight module includes a light box, at least one light guide tube, and at least one light source. The light box has a light exit side. The light guide tube has a plurality of microstructures which are spaced apart along a length of the light guide tube. The light guide tube and the microstructures are disposed in the light box in a particular arrangement so that the microstructures are placed substantially in a matrix array within the light box. The light source is disposed adjacent to the light guide tube, and is operable so as to emit a light beam to the light guide tube. The microstructures disperse the light beam from the light guide tube.

7 Claims, 7 Drawing Sheets

BACKLIGHT MODULE

CROSS-REFERENCE TO RELATED APPLICATION

This application claims priority of Taiwanese Application No. 094113866, filed on Apr. 29, 2005.

BACKGROUND OF THE INVENTION

1. Field of the Invention

The invention relates to a backlight module, more particularly to a backlight module having a light emitting diode (LED) as a light source.

2. Description of the Related Art

Referring to FIGS. 1 and 2, there are usually two types of backlight modules, i.e., a side-edge type of backlight module, as shown in FIG. 1, and a direct type of backlight module, as shown in FIG. 2. Since a relatively long distance is required for mixing lights emitted from LEDs 1 to obtain mixed light having even brightness and color, a light box 11 of a conventional backlight module cannot be reduced in thickness advantageously.

Although the distance for mixing the lights emitted from the LEDs 1 can be reduced by decreasing distances among the LEDs 1, in this way, the number of the LEDs 1 is increased, which in turn results in higher production costs, and aggravates the problem of heat dissipation. Additionally, a specific lens (not shown) can be used to improve the light mixing effect. However, the design for the lens is difficult, and the production cost thereof is relatively high. Furthermore, the light mixing effect achievable by the lens is limited when the arrangement density of the LEDs 1 used in the backlight module is small.

U.S. Pat. No. 6,726,341 discloses a storage compartment equipped with a light emitting diode (LED), in which a rigid rod is required as a light guide for guiding light emitted by the LED. U.S. Pat. No. 6,742,907 discloses a liquid crystal display device in which a light guide plate is required for guiding light illuminated from a point light source.

In the conventional backlight module as shown in FIG. 2, the LEDs 1 are usually installed in the light box 11. It is required to disassemble the light box 11 when broken LEDs 1 are to be replaced with new ones.

SUMMARY OF THE INVENTION

Therefore, the first object of the present invention is to provide a backlight module having an improved light mixing effect.

The second object of this invention is to provide a backlight module capable of reducing the required light mixing distance.

The third object of this invention is to provide a backlight module which can be used as a flat light source having a relatively small size.

The fourth object of this invention is to provide a backlight module which can be repaired with relative ease when necessary.

The fifth object of this invention is to provide a backlight module which can be fabricated at a relatively lower cost.

In one aspect of this invention, a backlight module includes a light box, a plurality of light guide tubes, and a plurality of light sources. The light box has a light exit side. The light guide tubes are disposed in the light box. Each of the light guide tubes has a plurality of microstructures which are spaced apart along a length of a corresponding one of the light guide tubes. The microstructures are placed substantially in a matrix array within the light box. Each of the light sources emits a light beam to a corresponding one of the light guide tubes. The microstructures disperse the light beam from the light guide tubes.

In another aspect of this invention, a backlight module includes a light box, at least one light guide tube, and at least one light source. The light box has a light exit side. The light guide tube is disposed in the light box and has a plurality of microstructures which are spaced apart along a length of the light guide tube. The microstructures are placed substantially in a matrix array within the light box. The light guide tube is bent to form a plurality of turns and a plurality of tube sections between the turns. The tube sections of the light guide tube extend substantially in the same direction. The light source is disposed adjacent to the light guide tube, and is operable so as to emit a light beam to the light guide tube. The microstructures disperse the light beam from the light guide tube.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
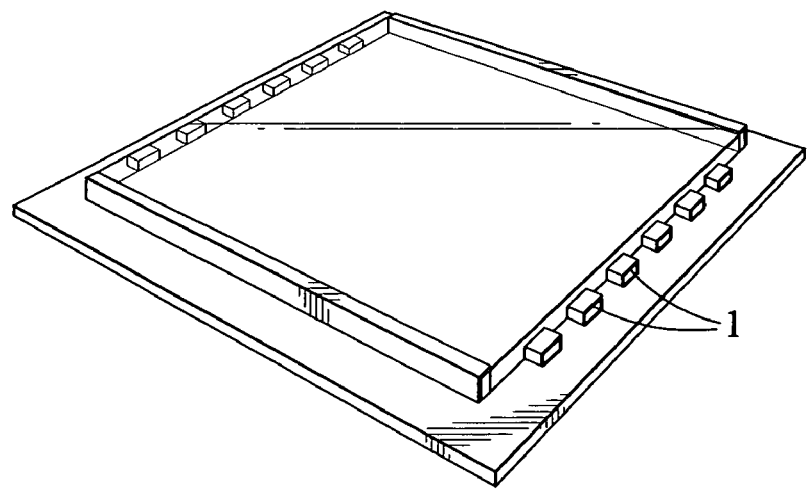
FIG. 1 is a perspective view of a conventional side-edge type of backlight module.
Figure 2:
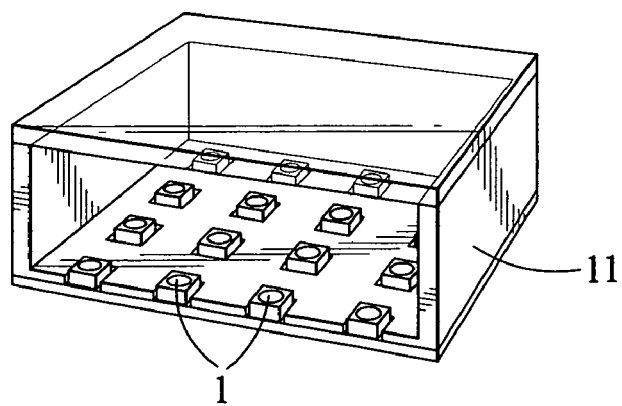
FIG. 2 is a perspective view of a conventional direct type of backlight module.

Before the present invention is described in greater detail, it should be noted that like elements are denoted by the same reference numerals throughout the disclosure.

Figure 3:
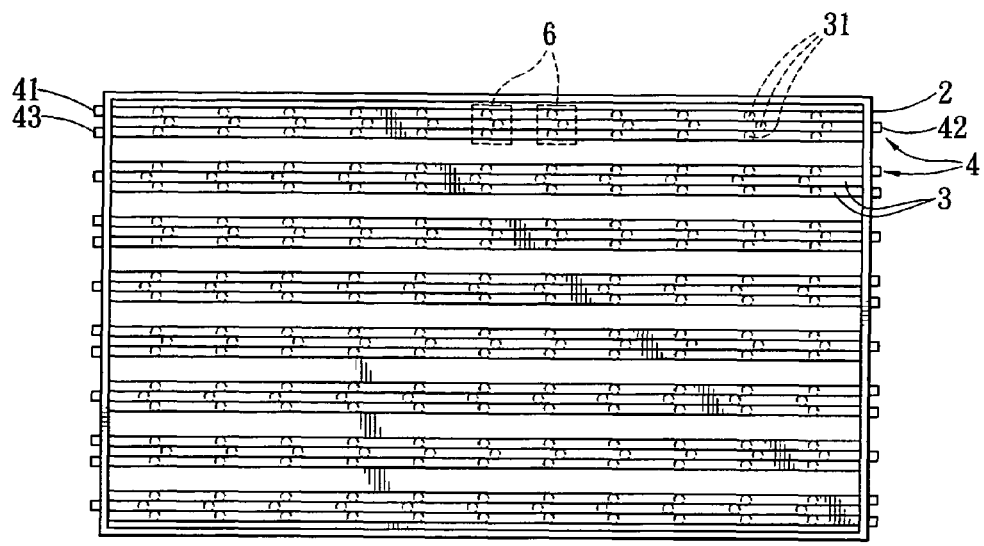
FIG. 3 is a schematic view of the first preferred embodiment of a backlight module according to this invention.
Figure 4:
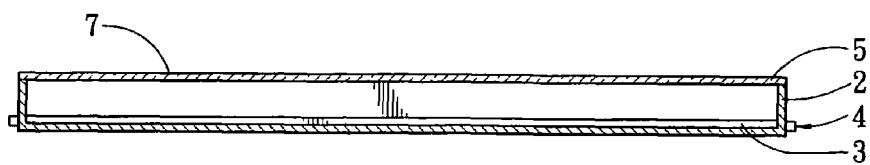
FIG. 4 is a sectional view of the first preferred embodiment.

Referring to FIGS. 3 and 4, the first preferred embodiment of a backlight module according to this invention is shown to include a light box 2, a plurality of light guide tubes 3, a plurality of light sources 4, and a light diffusing member 5.

The light box 2 has a light exit side 7, and is used to receive the light guide tubes 3 therein. Preferably, a reflecting film (not shown) can be disposed in the light box 2 so as to improve the light extracting efficiency.

Figure 5:
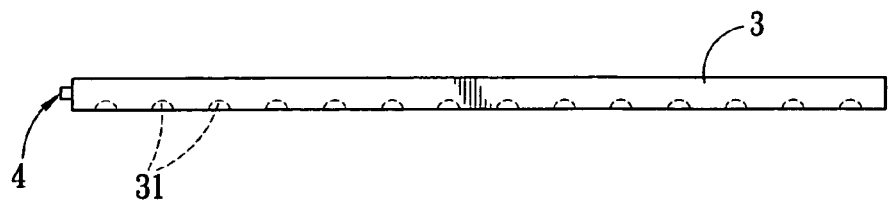
FIG. 5 is a schematic view of a light guide tube used in the second preferred embodiment of a backlight module according to this invention.

The light guide tubes 3 are substantially parallel to each other. Each of the light guide tubes 3 is configured as a tubular transparent body, and has a plurality of microstructures 31, which are spaced apart along a length of the light guide tube 3. The light guide tubes 3 and the microstructures 31 are disposed in the light box 2 in a particular arrangement so that the microstructures 31 are placed substantially in a matrix array within the light box 2. The light guide tubes 3 are made of a material, such as polycarbonate, polymethyl methylacrylate, glass, or the like, and have a refractive index ranging from 1.40 to 1.65. Each of the light guide tubes 3 guides light beam emitted by a corresponding one of the light sources 4 by total reflection so as to transmit the light beam along the length of the light guide tube 3. In the preferred embodiment, the microstructures 31 are formed on a bottom surface of the light guide tubes 3 by a highly reflective ink material, such as $SiO_2$, $TiO_2$ or the like, via screen printing. Alternatively, non-printing means, such as etching, stamping, slot-cutting, or the like, can be used together with injection molding to form the microstructures 31 on the bottom surface of the light guide tubes 3. Referring to FIG. 5, the microstructures 31 of the light guide tube 3 in the second preferred embodiment have a semi-spherical shape. Other geometrical shapes, such as oval shape, prismatic shape, conical shape, or the like, can be formed for the microstructures 31.

In the preferred embodiment, light emitting diodes (LEDs) are used as the light sources 4. Each of the light sources 4 is disposed adjacent to a corresponding one of the light guide tubes 3, and is operable so as to emit a light beam to the corresponding one of the light guide tubes 3. The microstructures 31 disperse the light beam from the corresponding one of the light guide tubes 3. Preferably, each of the light sources 4 is disposed adjacent to one end of the corresponding one of the light guide tubes 3 and outside the light box 2. The light sources 4 include a plurality of red light emitting diodes 41, a plurality of blue light emitting diodes 43, and a plurality of green light emitting diodes 42.

Figure 6:
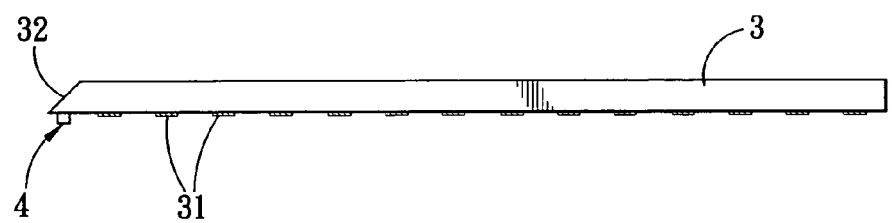
FIG. 6 is a schematic view of a light guide tube used in the third preferred embodiment of a backlight module according to this invention.

Referring to FIG. 6, in the third preferred embodiment of a backlight module according to this invention, each of the light sources 4 is disposed adjacent to one end of the corresponding one of the light guide tubes 3 and at a side of the corresponding one of the light guide tubes 3 opposite to the light exit side 7. The corresponding one of the light guide tubes 3 is formed with a sloping reflective surface 32 at the end for reflecting the light beam emitted from the corresponding one of the light sources 4 so that the light beam reflected by the sloping reflective surface 32 can be transmitted along the length of the corresponding one of the light guide tubes 3.

Figure 7:
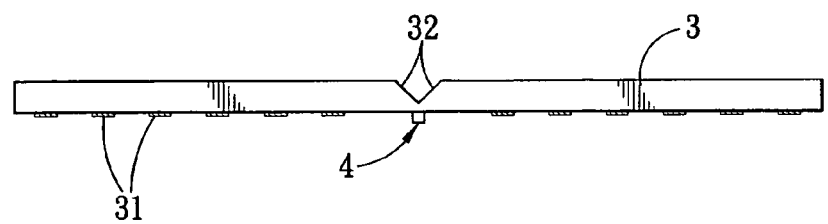
FIG. 7 is a schematic view of a light guide tube used in the fourth preferred embodiment of a backlight module according to this invention.

Referring to FIG. 7, in the fourth preferred embodiment of a backlight module according to this invention, each of the light sources 4 is disposed adjacent to the corresponding one of the light guide tubes 3 between two ends of the corresponding one of the light guide tubes 3 and at a side opposite to the light exit side 7. The corresponding one of the light guide tubes 3 is formed with two opposite sloping reflective surfaces 32 for reflecting the light beam emitted from the corresponding one of the light sources 4 so that the light beam reflected by the sloping reflective surfaces 32 can be transmitted along the length of the corresponding one of the light guide tubes 3.

Referring again to FIG. 3, the light guide tubes 3 are arranged in a plurality of groups. Each of the groups of the light guide tubes 3 has three of the light guide tubes 3, which receive the light beams from one of the red light emitting diodes 41, one of the blue light emitting diodes 43, and one of the green light emitting diodes 42, respectively. Each of the microstructures 31 of each of the light guide tubes 3 in each group cooperates with an adjacent one of the microstructures 31 of each of the other two of the light guide tubes 3 in the same group to form a microstructure unit 6 that produces a mixed white light. Preferably, the microstructures 31 of the microstructure unit 6 are arranged in a triangular array. Additionally, each of the microstructure units 6 can be arranged in other geometrical shapes. For example, the microstructures 31 of each of the microstructure units 6 can be arranged linearly. Therefore, each of the microstructure units 6 can function as a white light source. According to simulation calculations, a conventional backlight module in which a specific lens is used has a light mixing distance perpendicularly from the light exit side 7 of 50 mm. However, when the distance between two adjacent ones of the microstructure units 6 is 15 mm, the light mixing distance perpendicularly from the light exit side 7 of the backlight module of this invention is 20 mm, which is shorter than that calculated for the conventional backlight module.

The light guide tubes 3 in each group are juxtaposed coplanarly to each other in a direction substantially parallel to the light exit side 7 of the light box 2. Each group of the light guide tubes 3 is spaced apart from other ones of the groups of the light guide tubes 3. Furthermore, each of the microstructures 31 of the middle tube 3 of each group of the light guide tubes 3 is offset relative to the adjacent one of the microstructures 31 of each of the other two of the light guide tubes 3 in the same group toward a direction opposite to the direction which each of the microstructures 31 of the middle tube 3 of the adjacent group of the light guide tubes 3 is offset relative to the adjacent one of the microstructures 31 of each of the other two of the light guide tubes 3 in the adjacent group.

The light diffusing member 5 is mounted at the light exit side 7 of the light box 2, and is used to enhance uniform light distribution of the backlight module of this invention.

Figure 8:
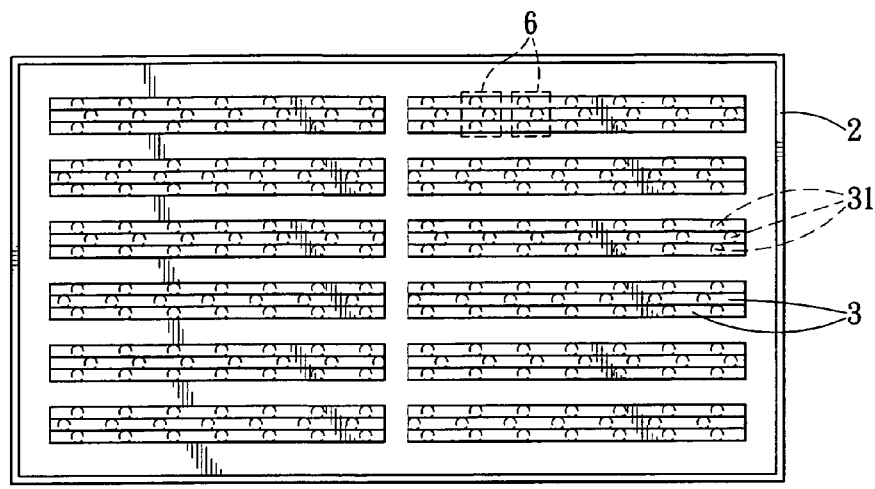
FIG. 8 is a schematic view of the fifth preferred embodiment of a backlight module according to this invention.
Figure 9:
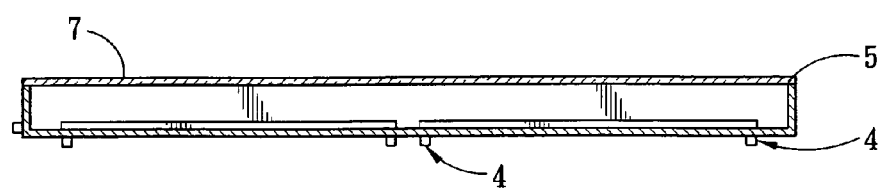
FIG. 9 is a sectional view of the fifth preferred embodiment.

Referring to FIGS. 8 and 9, the fifth preferred embodiment of a backlight module according to this invention is shown to be similar to the first preferred embodiment, except for the following: The light guide tubes 3 are arranged in a plurality of columns (two columns shown in this preferred embodiment), and each of the light sources 4 is disposed adjacent to one end of the corresponding one of the light guide tubes 3 and at a side opposite to the light exit side 7.

Figure 10:
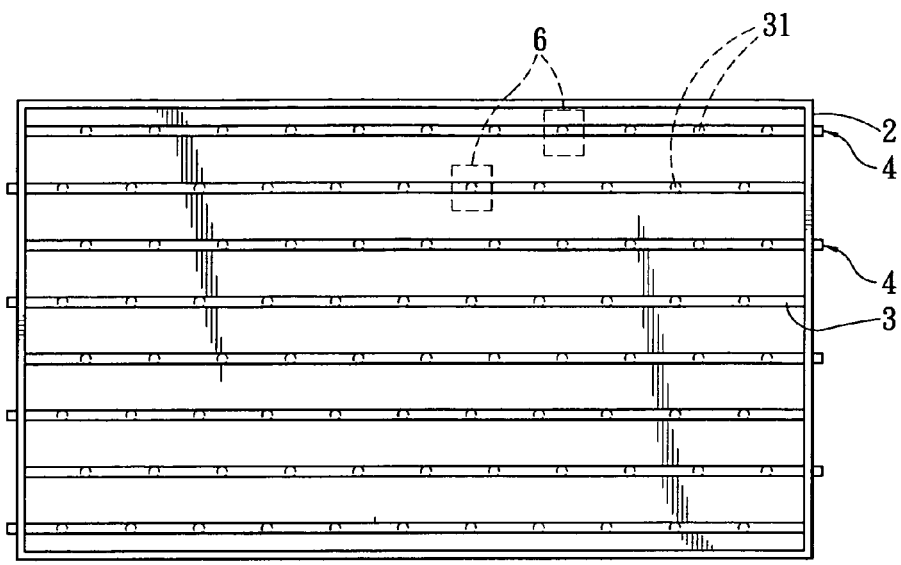
FIG. 10 is a schematic view of the sixth preferred embodiment of a backlight module according to this invention.
Figure 11:
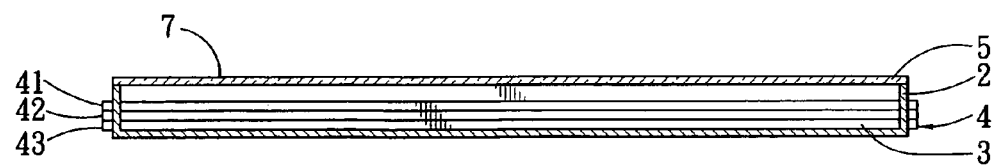
FIG. 11 is a sectional view of the sixth preferred embodiment.

Referring to FIGS. 10 and 11, the sixth preferred embodiment of a backlight module according to this invention is shown to be similar to the first preferred embodiment, except for the following: The light guide tubes 3 in each group are juxtaposed coplanarly to each other in a direction which is substantially perpendicular to the light exit side 7 of the light box 2. Each group of the light guide tubes 3 is spaced apart from other ones of the groups of the light guide tubes 3. The microstructures 31 of each of the microstructure units 6 are aligned with each other in a direction substantially perpendicular to the light exit side 7. The microstructure units 6 formed in each group of the light guide tubes 3 are staggered relative to the microstructure units 6 formed in an adjacent one of the groups of the light guide tubes 3.

Figure 12:
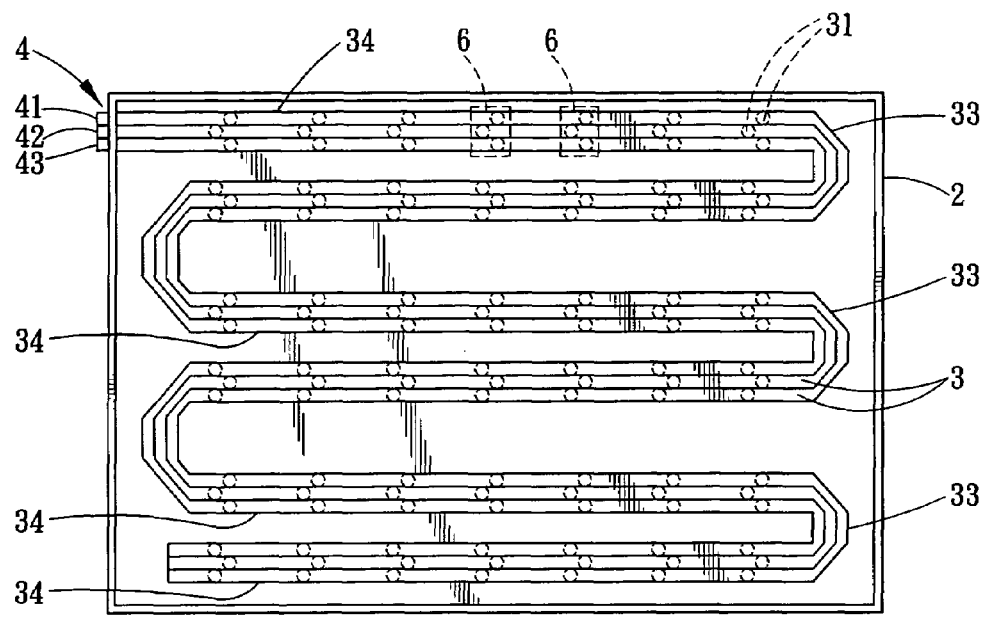
FIG. 12 is a schematic view of the seventh preferred embodiment of a backlight module according to this invention.
Figure 13:
FIG. 13 is a sectional view of the seventh preferred embodiment.

Referring to FIGS. 12 and 13, the seventh preferred embodiment of a backlight module according to this invention is shown to be similar to the first preferred embodiment, except for the following: The light guide tubes 3 are disposed in juxtaposition inside the light box 2. The light guide tubes 3 are bent concurrently so that each of the light guide tubes 3 forms a plurality of turns 33, and a plurality of tube sections 34 between the turns 33. The tube sections 34 of the light guide tubes 3 extend substantially in the same direction. The tube sections 34 of all of the light guide tubes 3 lie substantially in the same plane which is substantially parallel to the light exit side 7. In this preferred embodiment, the number of the light guide tubes 3 is three. The turns 33 of each of the light guide tubes 3 has an inner surface, which is total reflective so that the light beam emitted from each of the light sources 4 can be transmitted throughout the corresponding one of the light guide tubes 3. The light sources 4 include a red light emitting diode 41, a blue light emitting diode 43, and a green light emitting diode 42. Each of the microstructures 31 of each of the light guide tubes 3 cooperates with one of the microstructures 31 of each of the other two of the light guide tubes 3 to form the microstructure unit 6 that produces the mixed white light. In this preferred embodiment, the microstructures 31 of each of the microstructure units 6 are arranged in a triangular array.

Similar to the sixth preferred embodiment shown in FIGS. 10 and 11, three of the light guide tubes 3 in the seventh preferred embodiment can be juxtaposed coplanarly to each other in a direction which is substantially perpendicular to the light exit side 7 of the light box 2. The microstructures 31 of each of the microstructure units 6 are aligned with each other in a direction substantially perpendicular to the light exit side 7. The microstructure units 6 formed in each group of the tube sections 34 of the light guide tubes 3 are staggered relative to the microstructure units 6 formed in an adjacent one of the groups of the tube sections 34 of the light guide tubes 3.

Figure 14:
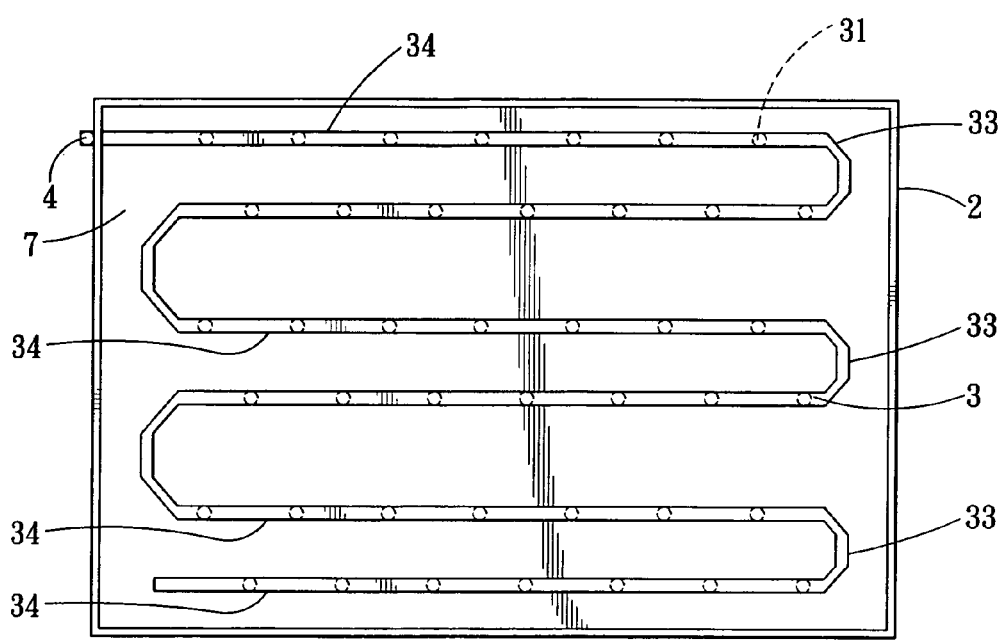
FIG. 14 is a schematic view of the eighth preferred embodiment of a backlight module according to this invention.

Referring to FIG. 14, the eighth preferred embodiment of a backlight module according to this invention is similar to the seventh preferred embodiment, except for the following: The backlight module of this preferred embodiment includes one light guide tube 3, which is bent to form a plurality of turns 33 and a plurality of tube sections 34 between the turns 33. The tube sections 34 extend substantially in the same direction and lie substantially in the same plane which is substantially parallel to the light exit side 7. The light source 4 used in this preferred embodiment is a white light emitting diode.

It should be noted that the microstructures 31 increase in size and density along the length of the light guide tubes 3 away from the light sources 4.

In view of the aforesaid, the backlight module of this invention has the following advantages:

(1) Since the light guide tubes 3 are formed with the microstructures 31 for dispersing the light beams from the light guide tubes 3, the light guide plate required in the prior art is not necessary in the present invention. Therefore, when the backlight module of the present invention is used as a flat light source, the flat size thereof is not limited.

(2) The light guide tubes 3 and the microstructures 31 can be disposed in the light box 2 in a particular arrangement according to the specific requirement. Therefore, the number of the light sources 4 can be reduced, and the light mixing distance perpendicularly from the light exit side 7 of the light box 2 for obtaining a mixed white light can be reduced as well.

(3) As compared to the prior art in which a specific lens is required, the light guide tubes 3 formed with the microstructures 31 can be produced in a relatively inexpensive manner. Therefore, the backlight module of the present invention incurs lower production costs.

(4) Since the light sources 4 are disposed outside the light box 2, they can be easily replaced with new ones whenever necessary.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A backlight module comprising:
a light box having a light exit side;
a plurality of light guide tubes disposed in said light box, each of said light guide tubes having a plurality of microstructures which are spaced apart along a length of a corresponding one of said light guide tubes, said microstructures being placed substantially in a matrix array within said light box; and
a plurality of light sources, each of which emits a light beam to a corresponding one of said light guide tubes, said microstructures dispersing the light beams from said light guide tubes,
wherein said light sources include a plurality of red light emitting diodes, a plurality of blue light emitting diodes, and a plurality of green light emitting diodes. said light guide tubes being arranged in a plurality of groups, each of said groups having three of said light guide tubes which receive the light beams from one of said red light emitting diodes, one of said blue light emitting diodes and one of said green light emitting diodes, respectively,
wherein each of said microstructures of each of said light guide tubes in each of said groups cooperates with an adjacent one of said microstructures of each of the other two of said light guide tubes in the same one of said groups to form a microstructure unit that produces a mixed white light, and
wherein said light guide tubes in each of said groups are juxtaposed coplanarly to each other in a direction substantially parallel to said light exit side of said light box, each of said groups of said light guide tubes being spaced apart from other ones of said groups of said light guide tubes.

2. The backlight module of claim 1, wherein said microstructures of said microstructure unit are arranged in a triangular array.

3. A backlight module comprising:
a light box having a light exit side;
a plurality of light guide tubes disposed in said light box, each of said light guide tubes having a plurality of microstructures which are spaced apart along a length of a corresponding one of said light guide tubes, said microstructures being placed substantially in a matrix array within said light box; and
a plurality of light sources, each of which emits a light beam to a corresponding one of said light guide tubes, said microstructures dispersing the light beams from said light guide tubes,
wherein said light sources include a plurality of red light emitting diodes, a plurality of blue light emitting diodes, and a plurality of green light emitting diodes, said light guide tubes being arranged in a plurality of groups, each of said groups having three of said light guide tubes which receive the light beams from one of said red light emitting diodes, one of said blue light emitting diodes and one of said green light emitting diodes, respectively,
wherein each of said microstructures of each of said light guide tubes in each of said groups cooperates with an adjacent one of said microstructures of each of the other two of said light guide tubes in the same one of said groups to form a microstructure unit that produces a mixed white light, and wherein said light guide tubes in each of said groups are juxtaposed coplanarly to each other in a direction which is substantially perpendicular to said light exit side of said light box, each of said groups of said light guide tubes being spaced apart from other ones of said groups of said light guide tubes.

4. The backlight module of claim 3, wherein said microstructures of said microstructure unit are aligned with each other in a direction substantially perpendicular to said light exit side of said light box, said microstructure units formed in each of said groups of said light guide tubes being staggered relative to said microstructure units formed in an adjacent one of said groups of said light guide tubes.

5. A backlight module comprising:
a light box having a light exit side;
a plurality of light guide tubes disposed in said light box, each of said light guide tubes having a plurality of microstructures which are spaced apart along a length of a corresponding one of said light guide tubes, said microstructures being placed substantially in a matrix array within said light box; and
a plurality of light sources, each of which emits a light beam to a corresponding one of said light guide tubes, said microstructures dispersing the light beams from said light guide tubes,
wherein each of said light sources is disposed adjacent to the corresponding one of said light guide tubes between two ends of said one of said light guide tubes and at a side opposite to said light exit side of said light box.

6. A backlight module comprising:
a light box having a light exit side;
at least one light guide tube disposed in said light box and having a plurality of microstructures which are spaced apart along a length of said light guide tube, said microstructures being placed substantially in a matrix array within said light box, said light guide tube being bent to form a plurality of turns and a plurality of tube sections between said turns, said tube sections of said light guide tube extending substantially in the same direction; and
at least one light source disposed adjacent to said light guide tube and operable so as to emit a light beam to said light guide tube, said microstructures dispersing the light beam from said light guide tube,
wherein said tube sections lie substantially in the same plane which is substantially parallel to said light exit side of said light box,
wherein the number of said light guide tubes is three, the number of said light sources being at least three, said light sources including a red light emitting diode, a blue light emitting diode and a green light emitting diode, each of said microstructures of each of said light guide tubes cooperating with one of said microstructures of each of the other two of said light guide tubes to form a microstructure unit that produces a mixed white light, and
wherein said microstructures of said microstructure unit are arranged in a triangular array.

7. The backlight module of claim 6, further comprising a light diffusing member provided at said light exit side of said light box.

* * * * *